Figure 2:
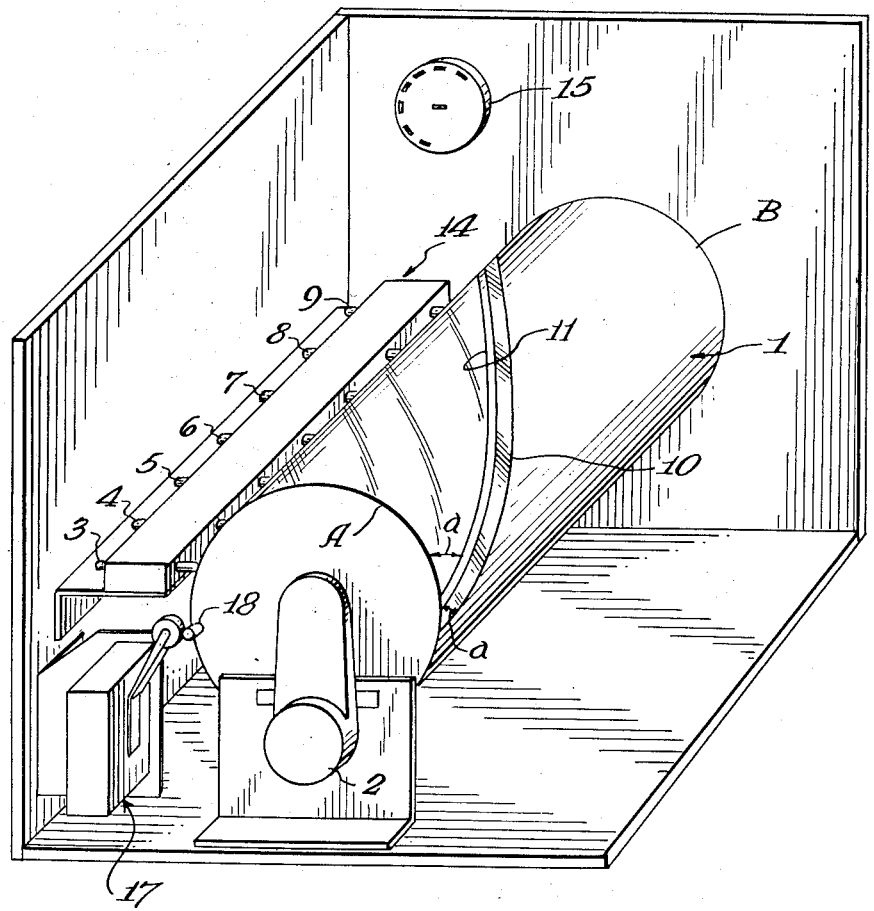

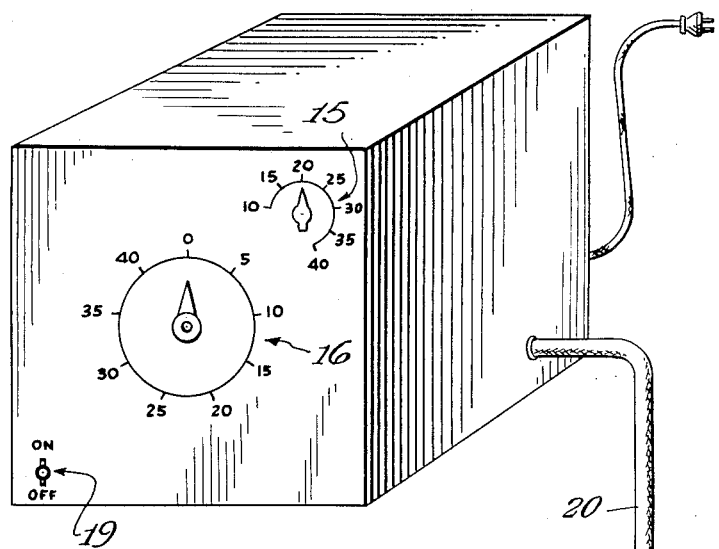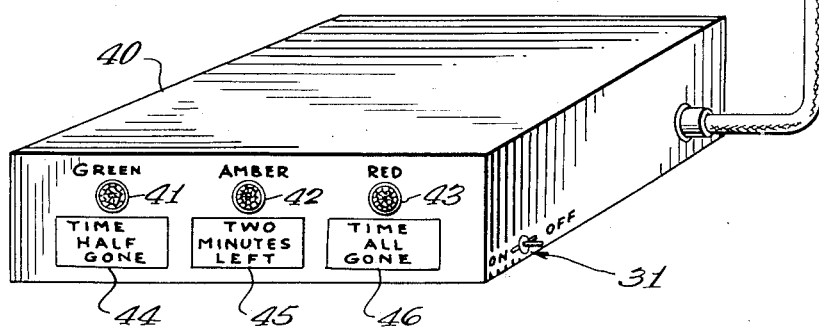

Sept. 29, 1959 B. A. RITZENTHALER 2,906,333
TIME INTERVAL DEVICE

Filed Dec. 30, 1954 3 Sheets-Sheet 2

INVENTOR.
Bruce A. Ritzenthaler
BY
Donald E. Payne
Attorney

Sept. 29, 1959

B. A. RITZENTHALER 2,906,333

TIME INTERVAL DEVICE

Filed Dec. 30, 1954

3 Sheets-Sheet 3

INVENTOR.
Bruce A. Ritzenthaler
BY
Donald E. Payne
Attorney

United States Patent Office
2,906,333
Patented Sept. 29, 1959

2,906,333

TIME INTERVAL DEVICE

Bruce A. Ritzenthaler, Chicago, Ill., assignor to Standard Oil Company, Chicago, Ill., a corporation of Indiana Application December 30, 1954, Serial No. 478,731

6 Claims. (Cl. 161—15)

This invention relates to a time interval device, and it pertains more specifically to an improved method and means for measuring and/or indicating the lapse of an allotted amount of time, and one or more fractional portions thereof.

Heretofore, it has been customary when indicating the lapse of a pre-selected time interval to use a timing device which would indicate by means of a light, bell or other indicator, the expiration of the time interval. In instances wherein it has been desirable to indicate that a fixed portion of the time interval remains, it has also been customary to have the timing device indicate this period. In the event that it was necessary that a percentage or fractional portion of the time interval be indicated, either a second timing device was necessary or reference had to be made to a clock, or the like. A primary object of this invention is to overcome the necessity of referring to, or using, other indicators or timing devices and to provide a novel method and means for automatically indicating the lapse of a fractional portion, and the entirety, of a pre-selected time interval. A further object is to provide a novel method and means for automatically indicating when half of a pre-selected time interval has lapsed. Still another object is to provide an apparatus of simple and rugged construction which may be easily set to indicate the lapse of one or more fractional portions of a pre-selected time interval. Yet another object is to provide a method and means to indicate the lapse of one or more fractional portions and the lapse of all but a few minutes of a pre-selected time interval. A more specific object is to provide a method and means to indicate the mid-point and also a fixed period before the end of an allotted amount of time. A still more specific object is to provide a method and means to indicate that half of an allotted amount of time has elapsed, that only two minutes remain and that the allotted amount of time has completely elapsed. An additional object of this invention is to provide a method and means to indicate that half of an allotted amount of time has elapsed, that the second half of the allotted time is running, that only two minutes remain, that the last two minutes are running and that the allotted amount of time has elapsed.

Another object of this invention is to provide a method and means which may be used in conjunction with analytical equipment, or the like, to control or operate said equipment. One example of this is in carrying out a common distillation for which it is often desirable to alter the heat input to the reboiler after a fractional portion of a selected time interval has lapsed. Yet another example is to control the heat input to a furnace. Often it is desirable, when drying or calcining compounds in a furnace, to alter the temperature after the lapse of a fractional portion of a selected time interval. Thus, once it has been established, for example, that the heat input to a furnace should be increased after the lapse of one-third of a time interval and then decreased at the end of two-thirds of said time interval, a device may be provided as hereinafter described to accomplish this object. These and other objects of my invention will become apparent to those skilled in the art as the description thereof proceeds.

Figure 3:
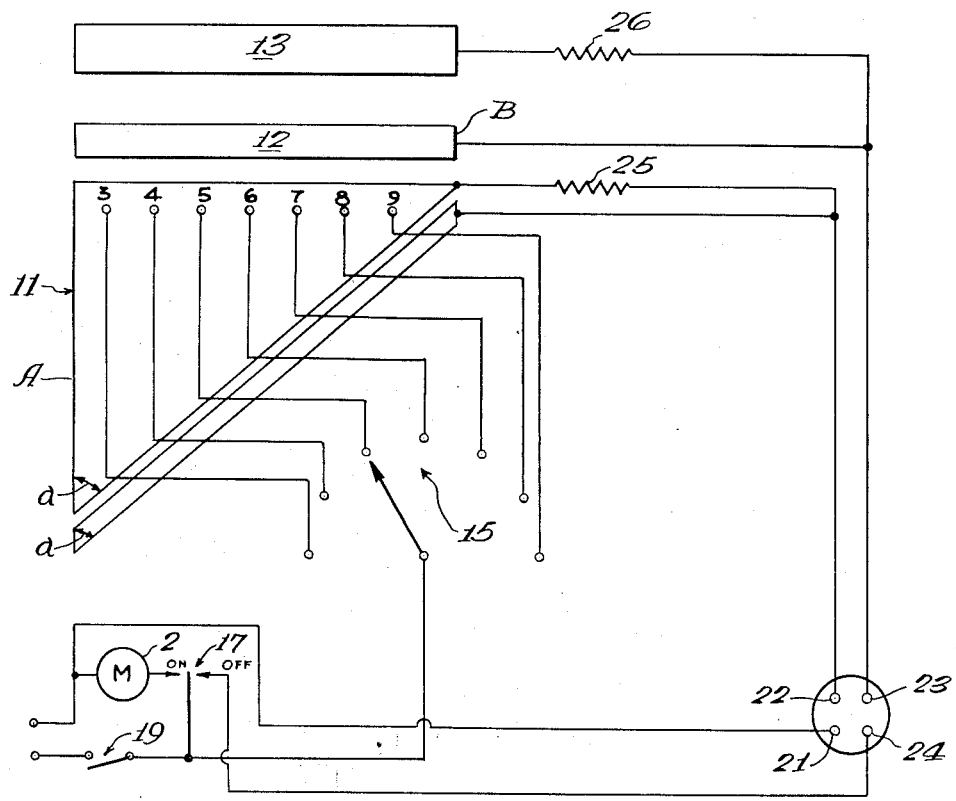
Figure 4:
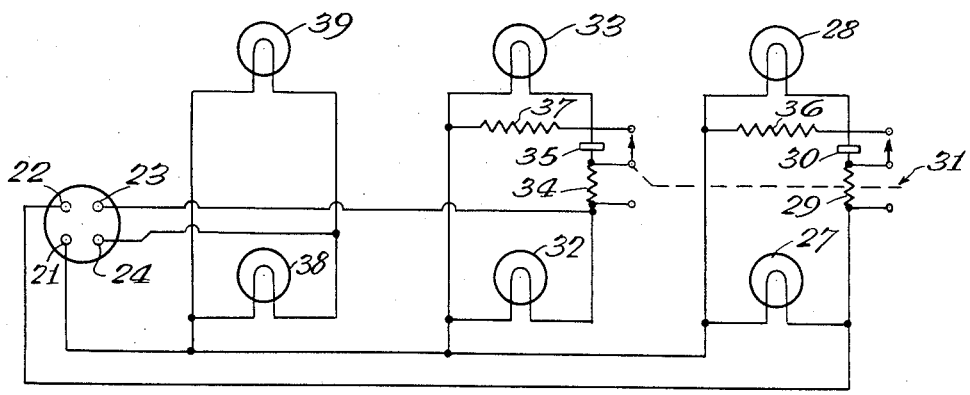

A feature of the invention is that a device is provided which may be set by two simple adjustments corresponding to a pre-selected time interval so that it will indicate to a speaker that half of his speaking time, or any fractional portion, has elapsed, that the second half of his allotted time is running, that he has only two minutes remaining, that the last two minutes are running and that his speaking period has completely lapsed. This is accomplished with a device comprising an electrically non-conducting cylinder which is rotated by means of an electric motor and having bonded to its surface, four electrically conducting plates. A projection is provided on one end of the cylinder to actuate an end position switch which stops the rotation of the cylinder and indicates the lapse of the selected time interval. A plurality of electrical contacts are mounted to bear against the surface of the cylinder and are positioned to correspond to different time intervals. The two simple adjustments, hereinbefore referred to, permit selection of any one of the electrical contacts corresponding to the time interval selected and permit rotating the cylinder in a direction, contrary to that imparted to it by the motor, to a position corresponding to the selected time interval. Also provided are indicators and appropriate electrical circuits for energizing the indicators when the selected contact engages the electrical conducting plates and when the projection on the cylinder actuates the end position switch. Further details and advantages of my device are described in connection with the accompanying drawings wherein:

Figure 1 is an isometric drawing of the entire system;
Figure 2 is an isometric cutaway of the timing means;
Figure 3 is a schematic representation of the timing means; and
Figure 4 is a circuit diagram of the indicator means.

In the example described and referring to Figure 2, a cylinder 1 is rotated by a constant speed motor 2 at 1/45 revolution per minute. Seven sliding contacts 3, 4, 5, 6, 7, 8, 9 are shown, any one of which may be selected by means of the selector switch 15, corresponding to the time interval desired.

In Figure 3, the cylinder is not actually shown, but rather a circumferential layout of the conducting section of the cylinder is shown. The body of the cylinder is made of a non-conducting material such as plastic, or the like. The cylinder contact plates 10, 11, 12, 13, which are made of a conducting material such as copper, are attached permanently to the cylinder. In addition, seven spring-loaded sliding contacts 3, 4, 5, 6, 7, 8, 9, mounted in a non-conducting holder block 14, are provided which are used to select various time intervals in conjunction with the proper setting of the selector switch 15 and the drum position indicator 16. An end position micro switch 17 is also provided which is actuated by an element 18 projecting from one end of the cylinder. A switch 19 is provided to turn the device on or off.

The first of the four electrically conducting plates 10 is a narrow strip attached to the cylinder at an acute angle α to the first peripheral edge A and extending to the second peripheral edge B of the cylinder. The third electrically conducting plate 11 covers the area bounded by the first electrically conducting strip 10, the first peripheral edge A of the cylinder and a line parallel to the axes of the cylinder and extending from the point of intersection of the first electrically conducting strip 10 and the second peripheral edge B. The fourth electrically conducting plate 12 is a narrow strip parallel to the axes of the cylinder and adjacent to the third electrically conducting plate 11 and extending from the first to the second peripheral edge of the cylinder. The second electrically conducting plate 13 is also a narrow strip parallel to the axes of the cylinder and adjacent to the fourth conducting strip 12 and extends from the first to the second peripheral edge of the cylinder. The projection on the cylinder 18, as hereinbefore described, extends outward from the first peripheral edge A of the cylinder at a point adjacent the second conducting strip 13.

A four-conductor cable 20 connects the timing device and the indicator means. The conductor 21 is common to all of the indicator lights and is connected to one side of the voltage supply source. Conductor 22 in the timing device is attached directly to contact plate 10. Contact plate 11 is also connected to conductor 22 through a voltage dropping resistor 25. Conductor 23 attaches directly to contact plate 12 and indirectly to contact plate 13 through a voltage dropping resistor 26. Conductor 24 is connected to the end position micro switch 17. In the circuit diagram of the indicator means, Figure 4, conductor 21 is connected in parallel to one side of all the indicator lights. Conductor 22 is connected directly to the other side of indicator light 27 and indirectly to the other side of indicator light 28 through a voltage dropping resistor 29 or a thermally activated blinking means 30. The double pole-double throw switch 31 permits one to make a selection between a blinking indicator and an indicator of reduced intensity. Conductor 23 is connected to indicator light 32 and indirectly to indicator light 33 through resistor 34 or blinking means 35. Switch 31 is also attached to this circuit to permit selection of blinking indicators or indicators of reduced intensity. Resistors 36 and 37 are connected in parallel with indicator lights 28 and 33 respectively to produce a current flow through blinking means 30 and 35 which will result in an optimum blinking rate. One side of indicator lights 38 and 39 are connected in parallel to conductor 24. The indicating circuits of Figure 4 are housed in a cabinet 40, Figure 1. Indicator light 28 is positioned directly behind the green jewel 41, indicator light 33 is positioned directly behind the amber jewel 42 and indicator light 39 is positioned directly behind the red jewel 43. Indicator lights 27, 32 and 38 are positioned respectively behind the translucent panels marked "Time Half Gone" 44, "Two Minutes Left" 45, and "Time All Gone" 46.

The device operates as follows: The On-Off switch 19 is set to the "On" position, thus energizing the entire system. Micro switch 17 is switched to the "On" position when the cylinder is rotated off its zero time position, thus causing motor 2 to be energized. The proper time for a particular speech, interval, or the like; for example, 30 minutes, is selected by turning switch 15 to 30 minutes which completes the circuit between one side of the power supply source and sliding contact 7. The cylinder is then rotated by means of the cylinder positioner 16 to the same time setting, i.e. 30 minutes. This results in rotating the cylinder in the opposite direction to which the motor rotates it to a circumferential distance covered by all of the metal contact plates at the 30-minute setting. To illustrate this setting, for half the rotation of the cylinder, the sliding contact 7, which is the energizing contact at this setting, would be contacting the non-conducting portion of the cylinder and for the other half of the 30-minute period, the contact would be sliding over the conducting portions of the cylinder. Thus, after 15 minutes, sliding contact 7 would engage contact plate 10, energizing indicator lights 27 and 28 through conductor 22. Accordingly, the "Time Half Gone" sign 44 would be illuminated and, depending upon the positioning of switch 31, the green jewel 41 would be seen to blink or glow. The intensity of this light may be regulated by selection of the proper wattage indicator lights or, very conveniently, by placing a resistor in series with the light. After sliding contact 7 has crossed over conducting plate 10 and engaged conducting plate 11, series resistor 25 is connected in the circuit. The size of this resistor is selected to drop the voltage just enough to cause the blinking means 30 to become inoperative. Thus, indicator light 28 is effectively removed from the circuit and only indicator light 27 is energized, although at a reduced intensity. The width of contact plate 10 is selected to permit energizing the blinker means and indicator light 28 for about 45 seconds, thus a speaker, or the like, is warned that half of his allotted time has elapsed and upon the expiration of the blinking light and the resulting reduced intensity of the "Time Half Gone" sign, he is made aware that he is in the second half of his allotted time period. At the end of 12 minutes and 15 seconds, or conversely two minutes and 45 seconds before the end of this or any other selected time period, sliding contact 7 leaves contact plate 11 and engages contact plate 12. This de-energizes indicator light 27 and causes the "Time Half Gone" sign 44 to go off and energizes indicator lights 32 and 33 through conductor 23. The circuits comprising resistors 34 and 37 and the blinking means 35 cause indicator light 33 to blink or glow at reduced intensity in the same fashion as was described in connection with indicator light 28. Contact plate 12 is also of such a width as to cause contact with the spring-loaded sliding contact 7 for 45 seconds. As the sliding contact leaves contact plate 12 and engages contact plate 13, voltage dropping resistor 26 is cut into the circuit thereby causing blinker 35 to become inoperative and to dim indicator light 32, thus causing the "Two Minutes Left" sign to glow at reduced intensity. Contact plate 13 is of such a width as to cause contact with sliding contact 7 for two minutes. At the end of this two-minute period, sliding contact 7 leaves contact plate 13, thus de-energizing indicator light 32 and causing the "Two Minutes Left" sign 45 to go off. The projecting element 18 on cylinder 1 then actuates end position micro switch 17 and throws it to the off position. This de-energizes the motor 2, which stops the rotation of the cylinder 1, and energizes indicator lights 38 and 39 through conductor 24. Red jewel 43 and the "Time All Gone" sign 46 are thus illuminated. The "Time All Gone" light will remain on until the timer is reset or the apparatus is turned off with On-Off switch 19.

Although the invention has been described with respect to a specific speaker indicator timer useful for indicating time intervals in the range of 10 to 40 minutes, it is within the scope of this invention to provide devices with various time interval ranges by making suitable changes, such as decreasing the rotational speed or increasing the diameter of the cylinder, or combinations thereof. Although the specific embodiment described indicates the lapse of half of a selected time interval, it is also within the scope of this invention to provide a device which will indicate the lapse of any percentage portion of a time interval. For instance, if it is desirable to indicate the lapse of one-third of a selected time interval, it may be accomplished by proper selection of rotational speed of the cylinder, providing electrical contact plates corresponding to plates 10 and 11 which form an angle α of 60° with edge A of cylinder 1, and properly calibrating the cylinder positioner 16 to correspond to the desired time intervals. The device may also be provided to indicate the lapse of a plurality of fractional portions of a selected time interval. For instance, a first electrical contact plate may be provided forming an angle α of 45° with an edge of the cylinder and a second contact plate could be provided forming an angle α of 60° with the edge of the cylinder. Proper placement of these contact plates on the cylinder in conjunction with the proper selection of rotational speed of the cylinder and calibration of the cylinder positioner would provide a device which would indicate the lapse of one-half and two-thirds of a selected time interval. Additional plates could be provided to indicate the lapse of any fractional portion of the selected time interval. It is also within the scope of this invention to incorporate additional fixed time interval plates, such as plates 12 and 13, in conjunction with the intervals as heretofore described. The use of lights as indicating means is by way of example only; indicating means, such as buzzers, bells, and the like, may be used.

Although the time interval device has been described with respect to its use as a speaker's indicator timer, this is by way of example only. The device may be used for any purpose wherein it is desirable to indicate the lapse of a fractional portion of a time interval. For instance, it may be used as heretofore described in conjunction with equipment, such as distillation columns, furnaces, or the like, to indicate that such distillation, reaction, heating period, or the like, has progressed to the extent of one-quarter, half, three-quarters, or any desirable fractional portion.

The device may also be used to control process variables, such as heat input to a reboiler, furnace, or the like. For example, and as pointed out previously, it may be desirable, when drying or calcining compounds in a furnace, to alter the temperature after the lapse of a fractional portion of a selected time interval. This may be accomplished by replacing the indicator light circuits with various heating elements or, if necessary, by replacing the indicator light circuits with relays which will in turn operate heating elements. Thus, once it has been established, for example, that it is necessary to increase the heat input to a furnace after the lapse of one-half of a time interval and then decrease the heat input for the last two minutes of the interval, appropriate heating elements in the furnace may be operated successively from contact plates 11 and 13. If desirable, indicator lights may be operated in parallel with the heating elements as previously described to visually indicate the portion of time which has elapsed.

It is further contemplated that modifications and revisions of the illustrated embodiments can be made by those skilled in the art without departing from the scope of the described invention.

What I claim is:

1. A time interval dividing device for dividing periods of time into fractional portions of time which device comprises a plurality of circuit closing contacts in linear array adapted to be maintained in contact with a reversibly rotatable surface comprising an electrically non-conductive base with electrically conductive segments thereon and having an edge, as a first said electrically conductive segment a helical segment of substantially uniform width and at an acute angle with relation to said edge, as a second said electrically conductive segment a segment of uniform width electrically isolated from said helical segment and at a less acute angle with relation to said edge, an electrically conductive lead from each of said electrically conductive segments, the electrically conductive lead from the first said electrically conductive segment being in electrical circuit with a first indicator corresponding to a predetermined divided fraction of a period of time, the electrically conductive lead from the second said electrically conductive segment being in electrical circuit with a second indicator corresponding to an end position for indicating complete lapse of said period of time, constant speed drive means for rotating said rotatable surface less than one complete revolution whereby the electrically non-conductive base and electrically conductive segments thereon are caused to pass from a starting position in successive substantially transverse contact with said plurality of circuit closing contacts in linear array in less than one complete revolution of said reversibly rotatable surface, said plurality of circuit closing contacts in linear array being selectively connected in electrical circuit with said first indicator and said second indicator, only one of said circuit closing contacts being capable of energizing said first and second indicators in a given time dividing operation, said one of said circuit closng contacts in circuit completing contact with said rotatable surface being capable of electrical energization of said first indicator and said second indicator by successive substantially transverse contact with the first said electrically conductive segment and the second said electrically conductive segment respectfully, and manual means for counter-rotating said reversibly rotatable surface to a starting position corresponding to a preselected period of divisible time with respect to rotation toward the second said electrically conductive segment and corresponding to a fractional portion of said preselected period of time with respect to rotation toward the first said electrically conductive segment.

2. The device of claim 1 which device includes a projection attached to the edge of said surface at a point corresponding to the end position; switch means to engage said projection at the end position to stop the rotation of said surface; a third indicator and a circuit for energizing said third indicator when said projection and said switch means engage.

3. The device of claim 2 which includes a third said electrically conductive segment on the electrically non-conductive base between the first said electrically conductive segment and the second said electrically conductive segment and electrically isolated from the first and second said electrically conductive segments; a fourth indicator; and a circuit for energizing said fourth indicator when said electrical contact engages the third electrically conductive segment corresponding to a duration of time defined by the period of time from the expiration of the fractional portion of said pre-selected period of time to the expiration of the total pre-selected period of time.

4. The device of claim 3 wherein the second said electrically conductive segment includes an electrically isolated fourth said electrically conductive segment, a fifth indicator, and a circuit for energizing said fifth indicator when the electrical contact engages the fourth said electrically conductive segment corresponding to a set length of time as a part of said duration of time to which the third said electrically conductive segment corresponds.

5. A time interval dividing device which comprises: an electrically con-conducting cylinder; having four electrically conducting segments attached to the surface of said cylinder, the first electrically conducting segment consisting of an electrically conducting strip attached to said cylinder at an acute angle to a first peripheral edge of said cylinder and extending to a second peripheral edge of said cylinder, the third electrically conducting segment consisting of an electrically conducting surface attached to said cylinder and covering the area bounded by said first electrically conducting segment, the first peripheral edge of said cylinder and a line parallel to the axes of said cylinder and extending from the point of intersection of said first electrically conducting segment and said second peripheral edge, the fourth electrically conducting segment consisting of an electrically conducting strip parallel to the axes of said cylinder and adjacent to said third electrically conducting segment and extending from the first peripheral edge to the second peripheral edge of said cylinder, the second electrically conducting segment consisting of an electrically conducting strip parallel to the axes of said cylinder and adjacent to said fourth electrically conducting segment and extending from the first peripheral edge to the second peripheral edge of said cylinder; a projection attached to a peripheral edge of said cylinder at a point corresponding to the edge of said second electrically conducting segment furthest from said fourth electrically conducting segment; a plurality of electrical contacts mounted to bear against said surface and positioned to correspond to different time intervals; means for rotating said cylinder at a constant rate of speed to an end position corresponding to the projection on said cylinder; means for rotating the cylinder in the direction opposite to the direction imparted by said constant speed means to a position corresponding to a pre-selected time interval; switch means for selecting one of said electrical contacts corresponding to a preselected time interval; an end position switch mounted to be actuated by the projection on said cylinder to stop the rotational movement of the cylinder; indicators and circuits for energizing said indicators when the selected contact engages said electrical conducting segments and when said projection on the cylinder actuates said end position switch.

6. An adjustable time interval dividing device which comprises in combination a reversibly rotatable non-revolving member having a base edge thereon, the surface of said member comprising electrically conducting and electrically non-conducting portions, said electrically conducting portion including a first electrically conducting segment comprising an elongated strip of substantially narrow uniform width, said strip extending obliquely from said base edge, and a second electrically conducting segment comprising an elongated strip of substantially narrow uniform width and extending normal to said base edge and transverse to the axis of said first segment, a linear array of selectable time fraction electrical contacts arranged to be aligned with said second conducting segment and being brought into co-linear alignment therewith by the rotation of said member, means for selecting one of said time fraction contacts to complete an electrical circuit with said first and second segments alternatively, said selected time fraction contact mounted to bear against the surface of said member to close an electric circuit upon the rotation of said member for duration of its contact with one of said first and second segments, electrical constant-speed drive means for rotating said member in a first direction while sliding said selected contact over the surface of said member, the duration of rotation of said member corresponding to a selected time interval to be divided, a first electrical indicator in said circuit including said first segment and said selected contact, said first electrical indicator remaining operative during the passage of said selected contact over said first segment during rotation of said member, a second electrical indicator in said circuit including said second segment, said second indicator remaining operative during the travel of said selected contact over said second segment during rotation of said member, said circuit including a power source and electrical conductors fixed to each of said respective electrically conducting segments and to said selected time-fraction contact, normally closed switch means in said circuit, means carried by said reversibly rotatable non-revolving member for opening said switch means when said second segment is rotated in register with said array, said normally closed switch means controlling said electrical constant-speed drive means whereby opening said switch stops the rotation of said member, and manual means for counter-rotating said member in a second direction to position said selected contact on the surface of said member at a point rotationally removed from said second segment and rotationally beyond the said first segment, said manual means including a time scale, whereby the selection of the time fraction contact and the counter-rotation of the said member resets the time divider with respect to said selected time interval to be divided into the desired fractions by the setting of said time scale and the selection of said selected time fraction contact.

References Cited in the file of this patent

UNITED STATES PATENTS

| | | |
|---|---|---|
| 445,341 | Striemer | Jan. 27, 1891 |
| 1,071,046 | Hall | Aug. 26, 1913 |
| 1,243,852 | Martyn | Oct. 23, 1917 |
| 1,812,897 | Owens | July 7, 1931 |
| 2,034,275 | Tarbox | Mar. 17, 1936 |
| 2,391,718 | Lindemann | Dec. 25, 1945 |